United States Patent
Murru et al.

(10) Patent No.: US 10,864,977 B2
(45) Date of Patent: Dec. 15, 2020

(54) MARITIME DRIFT CONTROL SYSTEM

(71) Applicants: ZF Friedrichshafen AG, Friedrichshafen (DE); ZF PADOVA SRL., Caselle di Selvazzano (IT)

(72) Inventors: Marco Murru, Arco (IT); Dave Gustin, Milford, MI (US); Gianantonio Bortolin, Wasserburg (DE); Andrea Pellegrinetti, Malcesine (IT); Daniel Piccini, Arco (IT); Keith Stanley, Coral Springs, FL (US); Andrew Orvieto, Plantation, FL (US)

(73) Assignees: ZF Friedrichshafen AG, Friedrichshafen (DE); ZF PADOVA SRL, Caselle di Selvazzano (IT)

( * ) Notice: Subject to any disclaimer, the term of this patent is extended or adjusted under 35 U.S.C. 154(b) by 115 days.

(21) Appl. No.: 16/080,128

(22) PCT Filed: Feb. 7, 2017

(86) PCT No.: PCT/EP2017/052574
§ 371 (c)(1),
(2) Date: Aug. 27, 2018

(87) PCT Pub. No.: WO2017/148655
PCT Pub. Date: Sep. 8, 2017

(65) Prior Publication Data
US 2019/0092443 A1    Mar. 28, 2019

(30) Foreign Application Priority Data

Mar. 2, 2016    (DE) ......................... 10 2016 203 373

(51) Int. Cl.
*B63H 25/04*        (2006.01)
*G05D 1/02*         (2020.01)

(52) U.S. Cl.
CPC ........... *B63H 25/04* (2013.01); *G05D 1/0206* (2013.01); *B63H 2025/045* (2013.01)

(58) Field of Classification Search
CPC . B63H 25/04; B63H 2025/045; G05D 1/0206
(Continued)

(56) References Cited

U.S. PATENT DOCUMENTS

| 5,331,558 A * | 7/1994 | Hossfield ............. | G05D 1/0206 114/144 RE |
| 2010/0023192 A1 * | 1/2010 | Rae ........................ | B63H 25/04 701/21 |

(Continued)

FOREIGN PATENT DOCUMENTS

EP    2 161 542 A1    3/2010

OTHER PUBLICATIONS

German Search Report Corresponding to 10 2016 203 373.5 dated Jan. 16, 2017.

(Continued)

*Primary Examiner* — Maceeh Anwari
(74) *Attorney, Agent, or Firm* — Davis & Bujold PLLC; Michael J. Bujold

(57) ABSTRACT

A maritime drift control system comprising a vessel movement detection unit, for detecting an actual vessel speed and direction, and a vessel movement control unit with a drift controller for controlling operation of at least one propulsion device of a vessel. The maritime drift control system comprises a drift error generator for generating drift error signals depending on a predetermined speed limit and the actual vessel speed. The drift error generator is connected to the drift controller to transmit the drift error signals to the drift controller. The drift controller uses the drift error signals to compute and transmit propulsion command signals to the at least one propulsion device in order to reduce speed and alter the direction of the vessel to target values.

(Continued)

Figure 1:
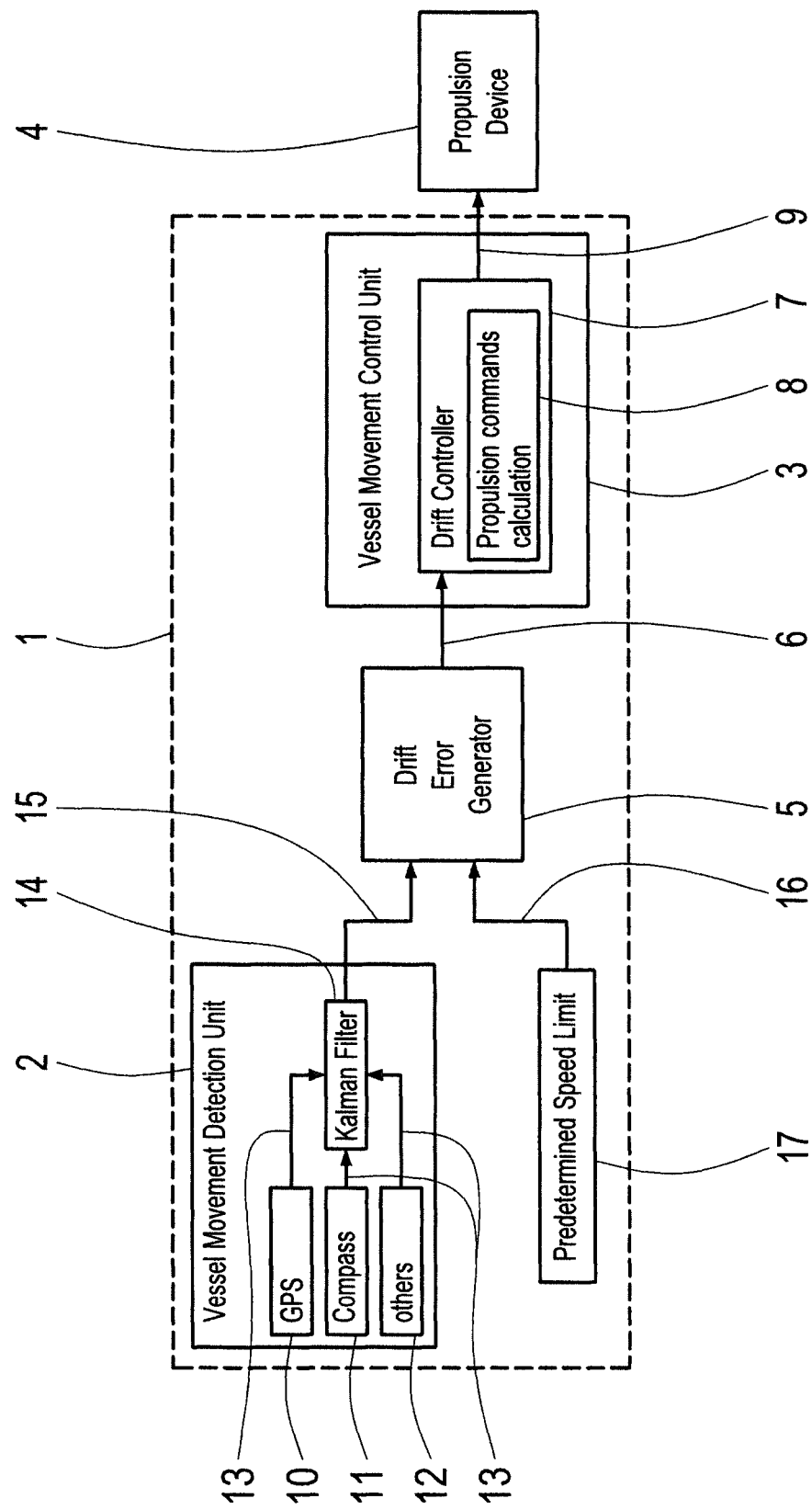

The invention comprises further a maritime vessel with a corresponding maritime drift control system.

13 Claims, 2 Drawing Sheets

(58) Field of Classification Search
USPC .......................................................... 701/21
See application file for complete search history.

(56) References Cited

U.S. PATENT DOCUMENTS

| 2010/0088030 A1 | 4/2010 | Stephens et al. |
| 2010/0138083 A1 | 6/2010 | Kaji |
| 2014/0041568 A1 | 2/2014 | Shamblin |
| 2015/0346730 A1 | 12/2015 | Stephens et al. |

OTHER PUBLICATIONS

International Search Report Corresponding to PCT/EP2017/052574 dated May 9, 2017.
Written Opinion Corresponding to PCT/EP2017/052574 dated May 9, 2017.

* cited by examiner

MARITIME DRIFT CONTROL SYSTEM

The present invention is related to a maritime drift control system comprising a vessel movement detection unit to detect actual vessel speed and heading, further comprising a vessel movement control unit with a drift controller which is able to control operation of at least one propulsion device of a vessel.

There are maritime control systems known in prior art which enable a ship to stay in a specific position. Such systems are usually called dynamic positioning systems or mooring systems. In situations where the ship has to be kept at a desired position, the actual position of the ship will be determined and in case of a deviation from the desired position the ships propulsion system will be activated in order to move the ship to the desired position. Hence, the engines of the ships propulsion system have to operate at least mostly, because there will always be a drift on the ship caused by the wind or the water current.

Such a dynamic positioning system is described for example in EP 2161542 A1. There a dynamic positioning architecture is described, enabling a vessel to maintain its heading and position by the use of thrusters, in opposition to environmental forces such as wind and water current.

A basically different approach is to allow a ship to drift in a certain direction and to control the drifting movement of the vessel. A typical use scenario would be to go fishing in the sea or on a lake with current and wind. If the vessel were powered off and unanchored, the wind and current can move the vessel in any direction and change the heading depending on the direction of the wind. This is undesirable for fishermen since this may result in the fishing lines getting tangled together when the vessel rotates or the vessel may traverse the area the operator wants to fish too quickly.

A solution for such a situation is described in US 2014/0041568 A1. A drift control device shall be coupled to the stern of a small boat to control the bow angle relative to the shoreline when drifting under the force of the wind and current. The drift control device comprises a rudder-like member coupled to the stern of the small boat by a mounting assembly. However such mechanical devices have only limited effect on the course and the heading of a ship drifting in wind and water currents and may not solve the above-mentioned problem in a sufficient way.

An object of the present invention is therefore to provide an improved maritime drift control system, which allows a vessel to drift in a desired direction while the heading and speed of the vessel is controlled.

The above object is achieved by a maritime drift control system according to claim 1. Further advantageous embodiments of the invention are contained in the dependent claims.

The present invention provides a maritime drift control system comprising a vessel movement detection unit, a vessel movement control unit and a drift error generator. The vessel movement detection unit is used to detect actual vessel speed and heading. The vessel movement control unit comprises a drift controller which is capable to transmit propulsion command signals to at least one propulsion device of the vessel. The drift error generator is required to generate drift error signals depending on a predetermined speed limit and the actual vessel speed. The drift error generator is connected to the drift controller to transmit the drift error signals to the drift controller. The drift controller is designated to use said drift error signals to compute and transmit propulsion command signals to the at least one propulsion device in order to reduce speed and heading of the vessel to target values.

The maritime drift control system can compute the control based on a mathematical model of vessel movement and propulsion thrust to determine the propulsion commands which result in forces to reduce the drift speed and the heading to the preset target values.

As long as the maritime drift control system is active, the vessel movement is caused at least mainly by the drifting forces wind and water current. Vessel speed shall be understood as the vessel's speed over ground. Heading is the orientation of the vessel with regard to its yaw axis. The direction of the vessel movement and speed does not necessarily correspond to the heading of the vessel when the maritime drift control system is active.

For activating the maritime drift control system there can be provided a switch or button for the operator of the vessel so as to activate a drift mode. The vessel can be positioned in a desired starting position and heading by the operator of the marine vessel before activating the drift mode. The starting position and heading can be determined for example in an attempt to minimize power consumption during drift mode in response to weather related events like wind and water currents. The optimum heading of a vessel might therefore be determined by minimizing the side force demand, i.e. the demand of propulsion force in the port-starboard direction as long as the drift mode is active.

In order to control the vessel's movement and heading for the purposes of the present invention it is necessary to control at least three degrees of freedom, namely surge, sway and yaw. Therefore the drift controller can be implemented as a PID controller using position, velocity and position integral error on surge, sway and optionally yaw axis to act on the propulsion device of the vessel, thereby allowing the vessel to drift with a certain speed in a certain direction.

According to a first preferred embodiment of the invention the drift error generator determines separate drift error signals at least for a surge axis and a sway axis of the vessel. This enables the operator to set predetermined speed limits separately for said axes of motion of the vessel, so for the forward and backward motion along the surge axis and for the side to side motion along the sway axis.

A rotational motion around the yaw axis shall be preferably be prevented during drifting so as to maintain the heading. In order to keep the heading of the vessel stable, the heading can be controlled by a dynamic positioning system. In this case a yaw error can be generated in the dynamic positioning system as a position error. However, another option is to control the heading as well by the maritime drift control system. For this the drift error generator can determine a separate drift error signal for the yaw axis of the vessel. Such drift error signals can be used by the drift controller to control the heading of the vessel as described further below with more details.

While the drift mode is active, the operator is able to change the predetermined speed limit between different preset values or to disable the predetermined speed limit for one of the axes entirely and allow the vessel to freely drift in this direction.

The error function can be linear or nonlinear in order to avoid the speed limit to be exceeded with a certain tolerance of speed and time. The way the error function is designed determines the response of the maritime drift control system.

The drift error signals can for example be generated by the drift error generator according to the following rules:

a) if actual vessel speed is lower than 50% of the predetermined speed limit, the drift error signal is zero,
b) if actual vessel speed is in the range between 50% and 150% of the predetermined speed limit, the drift error signal is in a low error range,
c) if actual vessel speed is greater than 150% of the predetermined speed limit, the drift error signal is in a high error range.

Corresponding to the above mentioned preferred embodiment, the actual vessel speed and the predetermined speed limit are determined and considered separately for the surge axis and for the sway axis when using these rules.

Preferably the drift error signal is a piecewise linear function of the actual vessel speed. This way a simple and clear control structure can be implemented which reduced efforts to carry out the invention. More specifically the drift error signal in the low error range "L" can be a linear function of the actual vessel speed with a first gradient and the drift error signal in the high error range "H" can be a linear function of the actual vessel speed with a second gradient, wherein the second gradient is higher than the first gradient. This enables a stronger response in the high error range, if the actual vessel speed is much higher than the predetermined speed limit, and a softer response, if the actual vessel speed is close to the predetermined speed limit.

According to another embodiment of the invention the drift error generator is designated to calculate the integral of the drift error signals. Additionally a decaying function can be applied to reduce said integral, when the actual vessel speed is below the predetermined speed limit. Such integral of drift error signal, i.e. the integral of the speed of the vessel can further be used by a dynamic position controller and be treated as position error while the dynamic position controller is activated in a position keeping mode.

Different methods and devices can be used to detect the vessel movement. Preferably the vessel movement detection unit comprises at least one of a GPS device and an inertial measurement unit. Such devices have proved to be reliable for such a purpose.

A Kalman filter to estimate the vessel state by weighting sensor measurements from a plurality of different sensors can also be part of the vessel movement detection unit. Such a Kalman filter may be enabled to consider the propeller and/or thruster speeds for the estimation of the vessel state. The term "vessel state" is intended to include at least the speed and the heading of the vessel.

Another aspect of the present invention is the control of the heading of the vessel. This can be done by a different system like a dynamic positioning system as described above, or it can be done as well by the maritime drift control system. Therefore another embodiment of the invention requires a drift controller which is designated to use a separate drift error signal for a yaw axis which is generated by the drift error generator to compute and transmit propulsion command signals to the at least one propulsion device, so that the rotational movement of the vessel around its yaw axis is controlled.

For the application of the invention on the sea or on a lake it will in many cases be advantageous to maintain the heading of the vessel stable as long as the drift mode is active, i.e. as long as the maritime drift control system is actuated. That is the case in the example which was described at the outset when fishermen try to avoid tangled fishing lines during drifting. For such application the invention comprises a drift controller which is designated to use the separate drift error signal for the yaw axis to compute and transmit propulsion command signals to the at least one propulsion device, so that the heading of the vessel is maintained.

However, according to another embodiment of the invention the heading of the vessel can be changed while the drift mode is active. This might be especially useful for an application of the maritime drift control system on rivers. In such an application it is advantageous to allow the vessel to follow the river while controlling drift speed and correcting the position to stay in a channel safe for navigation while keeping the vessel heading pointed either up river or down river and rotating around its yaw axis as the river turns.

For such applications the invention comprises an embodiment in which the drift controller is designated to use the separate drift error signal for the yaw axis to compute and transmit propulsion command signals to the at least one propulsion device, so that the heading of the vessel is changed depending on the position of the vessel in a river or channel.

For the determination of the heading the vessel movement detection unit comprises at least one of an electronic compass, a gyrocompass and a video camera.

The present maritime drift control system can be combined with a conventional dynamic positioning system and together be operated either in a drift mode or in a positioning mode. In the drift mode the vessel will be allowed to drift with a certain speed in a certain direction, whereas in the positioning mode the vessel will be kept in one specific location. Some components of the drift control system can be also assigned to the positioning system, so that these components are operating in the drift mode and in the positioning mode.

Eventually the present invention comprises a maritime vessel with at least one propulsion device and with a maritime drift control system as described above.

Said at least one propulsion device can comprise different command propulsion and/or steering components as well as a combination of these components. The propulsion device can include for example one or a plurality of an inboard engine, a motor, a transmission, a steerable rudder, a bow thruster, a stern thruster, an outboard engine, a water jet drive, a steerable pod-drive and an inboard/outboard drive.

Figure 2:
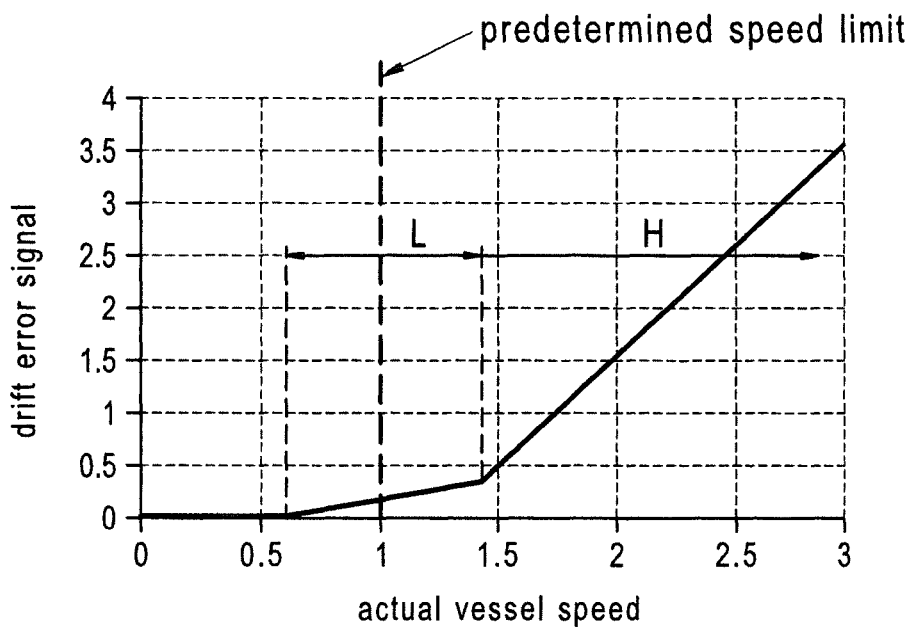
Figure 3:
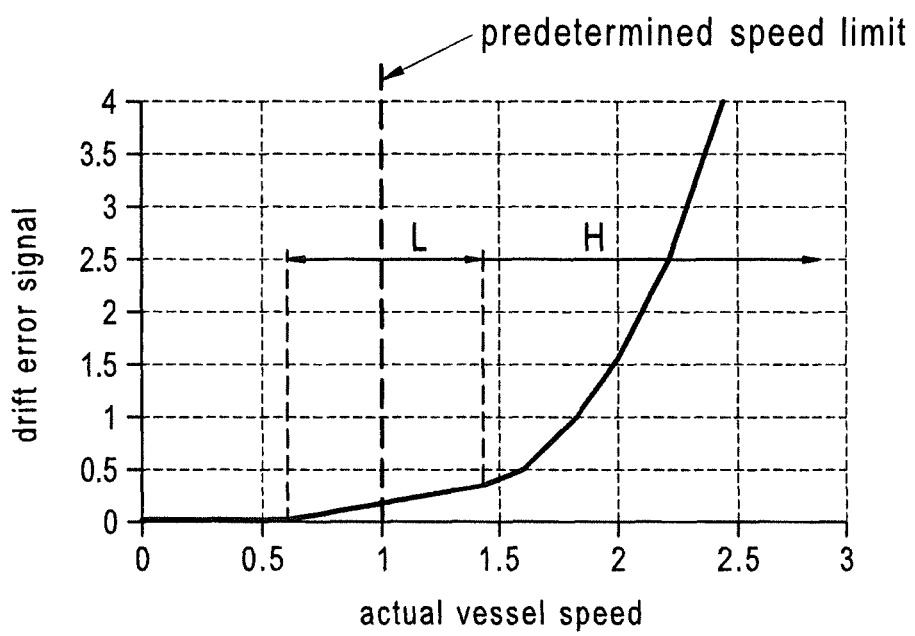

The following detailed description of a preferred embodiment of the invention in connection with the accompanying drawings will help to understand the objects, features and advantages of the invention, wherein:

FIG. 1 is a block diagram of a maritime drift control system according to the present invention, FIG. 2 is a graph with a first curve of a drift error signal depending on the actual vessel speed and a predetermined speed limit and FIG. 3 is a graph with a second curve of a drift error signal depending on the actual vessel speed and a predetermined speed limit.

The block diagram in FIG. 1 shows the main components of a maritime drift control system 1 according to the present invention. The main components are a vessel movement detection unit 2, a vessel movement control unit 3 with a drift controller 7, a propulsion device 4 and a drift error generator 5.

The vessel movement detection unit 2 is used to detect actual vessel speed and heading based on the measurement signals 13 of different measuring devices like a GPS 10 (global positioning system based on satellite navigation), an electronic compass 11 or other position measuring devices 12. The vessel movement detection unit 2 further comprises a Kalman filter 14 which estimates the vessel state by weighting sensor measurement signals 13 from a plurality of different measurement devices 10, 11, 12. The Kalman filter 14 may as well receive and compute signals about actual propeller and/or thruster speeds of the propulsion device 4 for the estimation of the vessel state. The Kalman filter 14 outputs vessel state signals 15 to a drift error generator 5. The vessel state signals 15 include at least information about speed and heading of the vessel.

The drift error generator 5 is capable and designated to generate drift error signals depending on a predetermined speed limit and the actual vessel speed. Therefore the drift error generator 5 receives a predetermined speed limit signal 16 and the vessel state signal 15. The predetermined speed limit signals 16 can be set and stored in a memory mean 17 which is part of the drift error generator 5 or connected to it. The maritime drift control system 1 includes at least one such memory mean 17. However, each of the vessel movement detection unit 2, the vessel movement control unit 3 and the drift error generator 5 can comprise a separate memory mean to store at least temporarily information which is measured, calculated, or transmitted by one of said components.

The drift error generator 5 is connected to the drift controller 7 to transmit drift error signals 6 to the drift controller 7. The drift controller 7 is part of the vessel movement control unit 3. The drift controller is capable and designated to compute and transmit propulsion command signals 9 to the propulsion device 4 of the vessel. The vessels position, speed and heading can be corrected by means of a PID controller in the drift controller 7 using position, speed and position integral error on surge, sway and optionally yaw axis in order to generate vessel body forces. Such vessel body forces are translated into the propulsion command signals 9 which are eventually sent to the propulsion device 4 in order to adjust speed and heading of the vessel. Propulsion command signals 9 may be calculated in a separate calculator 8 which is part of the vessel movement control unit 3 and can be part of the drift controller 7.

FIG. 2 and FIG. 3 depict two graphs with different curves of the drift error signal 6 which depends on the actual vessel speed and a predetermined speed limit. With other words these graphs show two different error functions. The way the error function is designed and the way the integral of the speed error is calculated determine the response of the maritime drift control system 1.

The horizontal axis in both graphs show the actual vessel speed for example in knots or in meters per second. The predetermined speed limit in these examples is set at a vessel speed of 1 knot resp. m/s.

The graph in FIG. 2 depicts an error function wherein the drift error signal is a piecewise linear function of the actual vessel speed. As long as the actual vessel speed is much lower than the predetermined speed limit, the drift error signal shall be zero, because there is no drift error in such a case. As soon as the actual vessel speed comes close to the predetermined speed limit, a low error range L will be reached. The low error range L can be described as a range where the actual vessel speed is close to the predetermined speed limit. In the low error range L the drift error signal is a linear function of the actual vessel speed with a first gradient. In the examples of FIG. 2 and FIG. 3 the low error range extends from about 60% up to about 140% of the predetermined speed limit. However, these limits may be chosen and set by the user of the drift control system individually.

When the actual vessel speed goes clearly beyond the predetermined speed limit a high error range H will be reached. In the high error range H the drift error signal is a linear function of the actual vessel speed with a second gradient, wherein the second gradient is higher than the first gradient. The high error range H can be described as a range where the actual vessel speed is much higher than the predetermined speed limit. In the example of FIG. 2 and FIG. 3 the high error range begins at about 140% of the predetermined speed limit. However this limit is adjustable as well.

The low gradient in the low error range L means that the drift error signal 6 increase is low relative to a vessel speed increase. Hence, the response of the maritime drift control system 1 will be on a lower level, whereas the high gradient in the high error range H means a quick increase of the drift error signal 6 relative to an increase of vessel speed and a quicker and stronger response. This way it is possible to avoid that the predetermined speed limit is exceeded, however with a certain tolerance of speed and time.

FIG. 3 shows a similar error function as FIG. 2. However, the error function in FIG. 3 differs in the high error range H, because the drift error signal there is no more a linear function of actual vessel speed. In the high error range H in FIG. 3 the drift error signal is at least nearly an exponential function of the actual vessel speed. This way an even stronger response of the maritime drift control system 1 will be generated, if the actual vessel speed exceeds the predetermined speed limit by more than 140%.

REFERENCE NUMERAL 1 maritime drift control system
2 vessel movement detection unit
3 vessel movement control unit
4 propulsion device
5 drift error generator
6 drift error signal
7 drift controller
8 propulsion commands calculation
9 propulsion command signals
10 GPS
11 Compass
12 other position measuring devices
13 measurement signals
14 Kalman filter
15 vessel state signal
16 predetermined speed limit signal
17 memory mean
L Low error range
H High error range

The invention claimed is:
1. A maritime drift control system of a vessel comprising:
a vessel movement detection unit having at least one position measurement device and at least one movement measurement device configured to detect actual vessel speed and heading, and
a vessel movement control unit with a drift controller which is connected to at least one propulsion device of the vessel,
a drift error generator is connected to the vessel movement detection unit and receives actual vessel speed and heading signals transmitted by the vessel movement detection unit, the drift error generator being configured to generate drift error signals depending on a predetermined speed limit and the actual vessel speed, the drift error generator is connected to the drift controller and transmits the drift error signals to the drift controller, the drift controller computes propulsion command signals based on the drift error signals and transmits the propulsion command signals to the at least one propulsion device to reduce a speed of the vessel to a target value, if the actual vessel speed is in a range between zero and a speed threshold value, which is between zero and the predetermined speed limit, the drift error signal generated by the drift error generator is zero, and if the actual vessel speed increases above the speed threshold value, the drift error signal increases, the drift error generator is configured to calculate an integral of the drift error signals, the drift error generator is configured, when the actual vessel speed is below the predetermined speed limit, to apply a decaying function to reduce said integral, and the at least one propulsion device being controlled based on the propulsion command signals received from the drift controller to adjust the speed of the vessel to the target value.

2. The maritime drift control system according to claim 1, wherein the drift error generator determines separate drift error signals at least for a surge axis and a sway axis of the vessel.

3. The maritime drift control system according to claim 1, wherein the drift error generator generates the drift error signals such that:
 a) if the actual vessel speed is lower than 50% of the predetermined speed limit, the drift error signal is zero,
 b) if the actual vessel speed is in a range between 50% and 150% of the predetermined speed limit, the drift error signal is in a low error range, and
 c) if the actual vessel speed is greater than 150% of the predetermined speed limit, the drift error signal is in a high error range.

4. The maritime drift control system according to claim 3, wherein the drift error signal is a piecewise linear function of the actual vessel speed.

5. The maritime drift control system according to claim 3, wherein the drift error signal in the low error range is a linear function of the actual vessel speed with a first gradient, and the drift error signal in the high error range is a linear function of the actual vessel speed with a second gradient, and the second gradient is higher than the first gradient.

6. The maritime drift control system according to claim 1, wherein the at least one position measurement device and the at least one movement measurement device are a GPS device and an inertial measurement unit, respectively.

7. The maritime drift control system according to claim 1, wherein the vessel movement detection unit comprises a plurality of different measurement devices having sensors, and estimates, via a Kalman filter, a vessel state by weighting sensor measurements from the sensors of the plurality of different measurement devices.

8. The maritime drift control system according to claim 7, wherein the Kalman filter is enabled to receive and compute at least one of actual propeller speed or actual thruster speed of the propulsion device for an estimation of the vessel state.

9. The maritime drift control system according to claim 1, wherein the drift controller is configured to use a separate drift error signal for a yaw axis, which is generated by the drift error generator to compute and transmit propulsion command signals to the at least one propulsion device, such that rotational movement of the vessel, around the yaw axis, is controlled.

10. The maritime drift control system according to claim 9, wherein the drift controller is configured to compute the propulsion command signals based on the separate drift error signal for the yaw axis, and transmit the propulsion command signals to the at least one propulsion device to maintain a direction of the vessel.

11. The maritime drift control system according to claim 9, wherein the drift controller is configured to compute the propulsion command signals based on the separate drift error signal for the yaw axis, and transmit the propulsion command signals to the at least one propulsion device to change a direction of the vessel depending on the position of the vessel in one of a river or a channel.

12. The maritime drift control system according to claim 1, wherein the vessel movement detection unit comprises at least one of an electronic compass, a gyrocompass and a video camera which is configured to determine the direction of the vessel.

13. A maritime vessel with a maritime drift control system and at least one propulsion device, the maritime drift control system having:
 a vessel movement detection Unit which detects actual vessel speed and direction of the vessel;
 a drift error generator is connected to the vessel movement detection unit and receives the actual vessel speed and direction therefrom; the drift error generator generates drift error signals depending on a predetermined speed limit and the actual vessel speed;
 a vessel movement control unit having a drift controller which is connected to the drift error generator and receives the drift error signals transmitted by the drift error generator, the drift controller is configured to compute propulsion command signals and transmit the propulsion command signals to the at least one propulsion device;
 the at least one vessel propulsion device is connected to the drift controller and receives the propulsion command signals transmitted therefrom, the at least one vessel propulsion device being controlled based on the propulsion command signals to adjust a speed of the vessel to a target value;
 the drift error generator generates a drift error signal equal to zero; if the actual vessel speed is lower than approximately 50% of the predetermined speed limit;
 the drift error generator generates a drift error signal in a high error range, if the actual vessel speed is greater than approximately 150% of the predetermined speed limit;
 the drift error generator generates a drift error signal in a low error range that is between zero and the high error range, if the actual vessel speed is in a range of between 50% and 150% of the predetermined speed limit;
 the drift error generator is configured to calculate an integral of the drift error signals;
 the drift error generator is configured, when the actual vessel speed is below the predetermined speed limit, to apply a decaying function to reduce said integral; and the at least one propulsion device being controlled based on the propulsion command signals received from the drift controller to adjust the speed of the vessel to the target value.

* * * * *